June 2, 1964 G. A. NELSON ETAL 3,135,057
FLIGHT SIMULATOR
Filed April 28, 1960 2 Sheets-Sheet 1

INVENTORS:
Gordon A. Nelson
Fredrick D. Henry
By Willard M. Graham
Agent.

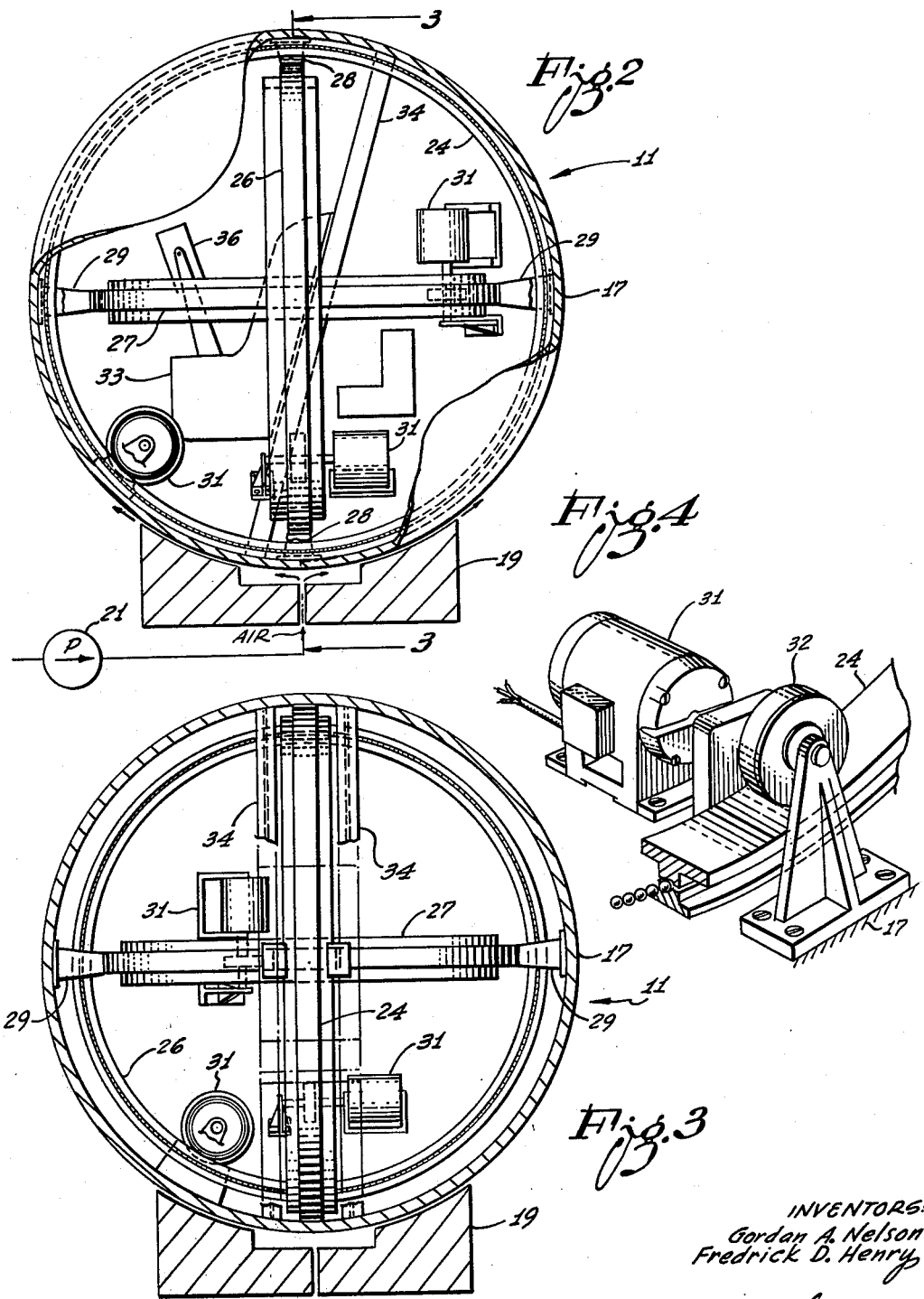

United States Patent Office 3,135,057
Patented June 2, 1964

3,135,057
FLIGHT SIMULATOR
Gordon A. Nelson, Los Angeles, and Fredrick D. Henry, Torrance, Calif., assignors to Northrop Corporation, Beverly Hills, Calif., a corporation of California
Filed Apr. 28, 1960, Ser. No. 25,422
7 Claims. (Cl. 35—12)

This invention pertains to flight simulators and more particularly to a spherical shell-like device adapted to subject a human being to rotation flight control problems which may be encountered in space flight.

Briefly the simulator as disclosed herein consists of a hollow sphere mounted on an air-bearing pedestal or the like for rotation about three axes having a normal relation with respect to each other. Rotation and control of the sphere is provided by power means and inertia rings which are mounted entirely within the sphere. Personnel whose capabilities are to be determined are positioned and restrained in an adjustable seat located within the sphere whereby rotation may be effected about the subject's head, heart or body center of gravity. Other provisions and further details of the simulator will be described as the specification progresses.

An object of the present invention is to provide a simulator capable of simulating the rotational flight control problems which may be encountered in space flight.

Another object is to provide a simulator rotatable about three perpendicular axes corresponding to roll, pitch and yaw movements or any combination thereof.

Another object is to provide a simulator comprising a hollow sphere mounted for universal rotational movement and in which the propulsion means for said sphere is located entirely within the sphere.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 2 is a side elevation view of the simulator shown in FIGURE 1 with portions thereof broken away to show its internal construction.

FIGURE 3 is a cross-sectional view of the simulator taken on the line 3—3 of FIGURE 2.

FIGURE 4 is a fragmentary view showing a typical drive means for the simulator shown in FIGURE 1.

Figure 1:
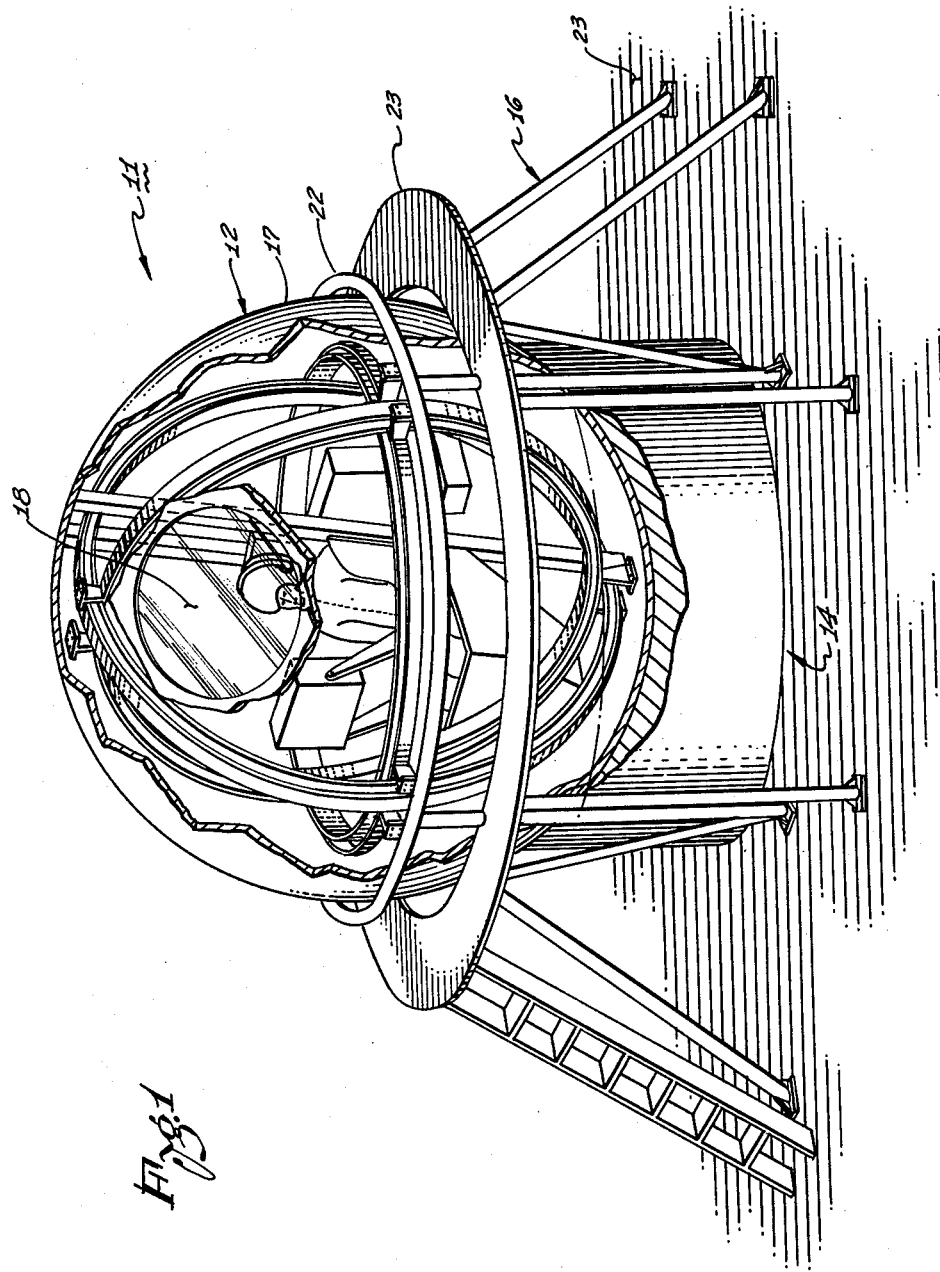
FIGURE 1 is a perspective view of the simulator as disclosed herein.

Referring to the drawings, FIGURE 1 shows a preferred embodiment of a simulator 11 of the type disclosed herein which is capable of simulating rotational flight control problems which will be encountered in space flight. The simulator 11 consists of a sphere assembly, a pedestal or base assembly and a combined inspection and safety rail assembly 12, 14, and 16, respectively.

The sphere assembly 12 includes a spherical shell 17 constructed of a single thickness of material substantially as shown in FIGURES 1, 2, and 3. If a shell of single wall construction is found inadequate for any reason a bonded type sandwich construction may be utilized. This latter type of construction includes inner and outer skins having a honeycomb core bonded therebetween. It will be apparent that a shell constructed in the latter manner will have good noise insulating qualities and superior structural integrity as compared to a sphere having a single wall.

Access to the sphere 17 is provided by means of a door 18 having a flush relation with the outer surface of the shell 17 when in its closed position. In the closed position of the door 18 it provides a pressure tight seal with the shell 17, accordingly pressures other than ambient may be established inside the shell 17. An air valve and a drain valve (not shown), each having a flush relation with respect to the outer surface of the shell 17, are provided in the wall of the shell. The air valve provides means whereby the interior of the shell 17 may be evacuated and subsequently returned to ambient pressure while the drain valve is utilized for draining any liquid which may accumulate in the shell 17.

The pedestal or base assembly 14 constitutes an air-bearing 19 of a type shown and described in U.S. Patent 2,695,199. Briefly the concave surface of the bearing 19 is contoured to match the external surface of the shell 17. Pressurized air, provided by a pump 21 or the like, is supplied to the mating surfaces of the bearing 19 and shell 17 at such times as the simulator 11 is being utilized. In addition, an emergency supply of pressurized air (not shown) is available to provide flotation of the shell 17, for a period adequate to rotate the shell to a position in which the door 18 is in an accessible position, in case of failure of the primary source 21.

A further safety provision is provided by the assembly 16. The assembly 16 includes a tubular steel bumper rail 22 which encircles the shell 17 adjacent its mid-section. The rail 22 has a parallel relation with respect to the supporting surface 23 and is spaced a slight distance from the outside surface of the shell 17 to provide clearance between the rail and the shell. Located directly below the rail 22 is a circular platform 23 arranged substantially as shown in FIGURE 1. The platform 23 provides means enabling personnel to enter and leave the simulator 11. Further, the platform 23 provides means whereby equipment may be mounted in or removed from the shell 17 and serves as an inspection platform for observing personnel inside the shell.

Rotation of the simulator is induced and controlled by three race assemblies 24, 26, and 27 mounted internally of the shell 17. The three race assemblies, each including inner and outer races, are mounted about three axes having a normal relation with respect to each other and are able to impart rotary movement to the shell 17 in three planes corresponding to roll, pitch and yaw as presently explained.

The outer race of the assembly 24 is secured directly to the inside surface of the shell 17 with the central plane of the assembly 24 coinciding with a diameter of the shell 17. The outside diameter of the outer race of the assembly 26 is slightly less than the inside diameter of the inner race of the assembly 24. As assembled in the shell 17 the central plane of the assembly 26 has a normal relation with respect to the central plane of the assembly 24 and is further characterized in that the central plane of the assembly 26 also coincides with a diameter of the shell 17. The relation of the assembly 27, with respect to the assembly 26, is the same as that just described in connection with the assembly 26 with respect to the assembly 24. It will now be seen that the three assemblies 24, 26 and 27 have a normal relation with respect to each other.

The outside race of the assembly 26 is attached to the wall of the shell 17 by means of brackets 28—28 which span the assembly 24 and allow free rotational movement of the inner race of the assembly 24. The outside race of the assembly 27 is similarly attached to the wall of the shell 17 by means of brackets 29—29 which also span the assembly 24 to allow free rotational movement of the inner race of the assembly 24. So assembled it will be seen that there is no interference between the assemblies 24, 26 and 27 and that the inner races of each race assembly is free to rotate on ball bearings in a manner presently decsribed.

The power installation for rotating the inner race of the assembly 24 and in turn the shell 17 is shown in FIGURE 4. The power installation includes a constant torque type reversible electric motor 31 which is positioned adjacent the assembly 24 with its base attached to shell 17. The output member of the motor 31 carries a rubber covered drive wheel 32 which frictionally contacts and drives the inner race of the assembly 24. Similar power installations are provided to impart rotary movement to the inner races of the assemblies 26 and 27. It will now be seen that the inner races, hereinafter referred to as inertia rings, may be rotated while their outer races remain fixed with respect to the shell 17. The inertia rings, however, remain fixed with respect to their initial axis.

All control and other equipment for the simulator 11, including a source of power (not shown) for the electric motors 31, is located within the shell 17 so that the center of gravity of the shell coincides with the geometric center of the shell and the mass moment of inertia of the shell about any axis is a minimum and as nearly uniform as possible. Equipment mounted in the shell includes a seat 33 mounted on a pair of supporting rails 34—34 fixedly secured to the wall of the sphere 17. The seat 33 is movable along the rails 34 so that a person secured therein may be moved to various positions in the shell 17 and thereby permit rotation of the subject about various of his vital organs.

Control means for the motors 31 are located on a control panel 36 or on the arms of the seat 33. The controls will be electrically operated and will function through a conventional receiver-transmitter link to a monitor (not shown) located at a ground control station. Accordingly rotational movement of the shell 17 may be controlled from within the shell or from the ground control station. Control signals originating within the simulator may be over-ridden by signals from the ground control station if such procedure is desired or becomes necessary.

Operation of the simulator, at such time as the shell 17 is floating in the air-bearing assembly 14, is achieved by controlling the application of power to one or more of the motors 31. Consider the ring assembly 24, the inner race or inertia ring of this assembly has a mass moment of inertia of known proportion with respect to the mass moment of inertia of the shell 17 and equipment mounted therein. Torque from the motor 31 acting through the driving wheel 32 will cause the inertia ring of the assembly 24 to rotate in one direction and, because the motor 31 is attached to the wall of the shell 17, the shell will be rotated in the opposite direction. The ratio of accelerations of the inertia ring of the assembly 24 and the shell 17, although in opposite directions, will be directly proportional to their respective mass moments of inertia as set forth in the following equation:

$$I_{Total} \cdot \alpha_{Total} = I_{Inner\ race} \cdot \alpha_{Inner\ race}$$

$I_{Total}$ = Total mass moment of sphere
$\alpha_{Total}$ = Angular movement of sphere
$I_{Inner\ race}$ = Mass moment of inner race
$\alpha_{Inner\ race}$ = Angular movement of inner sphere Similar rotational movement may be imparted to the shell 17 by the assemblies 26 and 27 and associated power means. It will be apparent that the relationship of the power assemblies 31 and the race assemblies 24, 26 and 27 will not change as universal angular movement is imparted to the sphere 17. Accordingly it will be seen that rotational movement may be imparted to the shell 17 corresponding to roll, pitch and yaw movements and combinations thereof. Such movements may be referred to as true universal rotational movement.

While, in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In a flight simulator the combination comprising: a fluid bearing; a hollow sphere mounted on said bearing for universal angular movement; three circular race assemblies each including inner and outer races; the outer race of each race assembly being fixedly secured to the inner surface of the wall of said sphere with the central planes of each race having a normal relation with respect to each other; and power means having output members; said power means being mounted on the inner surface of said sphere with said output members contacting said inner races and functioning to impart rotational movement directly to the inner races of said race assemblies and indirectly said universal angular movement to said sphere.

2. In a flight simulator the combination comprising: a fluid bearing; a hollow sphere mounted on said bearing for universal angular movement; three circular race assemblies each including inner and outer races; the outer race of each race assembly being fixedly secured to the inner surface of the wall of said sphere with the central planes of each race having a normal relation with respect to each other; a plurality of power assemblies secured to the wall of said sphere with a respective power assembly mounted adjacent each of said race assemblies; and each of said power means having an out member contacting the inner races of said race assemblies and functioning to impart rotational movement directly to the inner races of said race assemblies and indirectly said universal angular movement to said sphere.

3. In a flight simulator the combination comprising: a fluid bearing; a hollow sphere mounted on said bearing for universal angular movement; three circular race assemblies each including inner and outer races; the outer race of each race assembly being fixedly secured to the inner surface of the wall of said sphere with the central planes of each race having a normal relation with respect to each other; a power assembly mounted adjacent each of said race assemblies including a prime mover having an output member; and said power assemblies being characterized in that each of said prime movers is fixedly secured to the inner surface of the wall of said sphere and the output members frictionally contacting the inner races whereby rotational movement may be directly imparted to the inner races of said race assemblies and indirectly said universal angular movement to said sphere.

4. In a flight simulator the combination comprising: a fluid bearing; a hollow sphere having a wall of substantially uniform thickness; said sphere being mounted on said bearing for universal angular movement thereon; three circular race assemblies each being symmetrically constructed about a central plane and each including inner and outer races; the outer race of each race assembly being fixedly secured to the inner surface of the wall of said sphere with the central plane of each race assembly containing the geometrical center of said sphere and having a normal relation with respect to each other; a power assembly mounted adjacent each of said race assemblies including a reversible prime mover having a rotatable output member; and said power assemblies being characterized in that each of said prime movers is fixedly secured to the inner surface of the wall of said sphere and the output members frictionally contacting the inner races whereby rotational movement may be directly imparted to the inner races of said race assemblies and indirectly said angular movement to said sphere.

5. In a flight simulator the combination comprising: a hollow sphere; three circular race assemblies each including inner and outer races; the outer race of each race assembly being fixedly secured to the inner surface of the wall of said sphere with the central planes of each race having a normal relation with respect to each other; a plurality of power assemblies secured to the wall of said sphere with one of said power assemblies being respectively mounted adjacent each of said race assemblies; and each of said power means having an out member contacting the inner races of said race assemblies and functioning to impart rotational movement directly to the inner races of said race assemblies and indirectly universal angular movement to said sphere.

6. In a flight simulator the combination comprising: a hollow sphere; three circular race assemblies each including inner and outer races; the outer race of each race assembly being fixedly secured to the inner surface of the wall of said sphere with the central planes of each race having a normal relation with respect to each other; a power assembly mounted adjacent each of said race assemblies including a prime mover having an output member; and said power assemblies being characterized in that each of said prime movers is fixedly secured to the inner surface of the wall of said sphere and the output members frictionally contacting the inner races whereby rotational movement may be directly imparted to the inner races of said race assemblies and indirectly universal angular movement to said sphere.

7. In a flight simulator the combination comprising: a hollow sphere having a wall of substantially uniform thickness; three circular race assemblies each being symmetrically constructed about a central plane and each including inner and outer races; the outer race of each race assembly being fixedly secured to the inner surface of the wall of said sphere with the central plane of each race assembly containing the geometrical center of said sphere and having a normal relation with respect to each other; a power assembly mounted adjacent each of said race assemblies including a reversible prime mover having a rotatable output member; and said power assemblies being characterized in that each of said prime movers is fixedly secured to the inner surface of the wall of said sphere and the output members frictionally contacting the inner races whereby rotational movement may be directly imparted to the inner races of said race assemblies and indirectly angular movement to said sphere.

References Cited in the file of this patent

UNITED STATES PATENTS

| | | |
|---|---|---|
| 1,340,570 | Smith | May 18, 1920 |
| 1,342,871 | Ruggles | June 8, 1920 |
| 1,393,456 | Ruggles | Oct. 11, 1921 |
| 2,289,877 | Dreyer | July 14, 1942 |
| 2,344,454 | Plotner | Mar. 14, 1944 |
| 2,528,516 | Hermann | Nov. 7, 1950 |
| 2,695,199 | Blizzard | Nov. 23, 1954 |
| 2,960,878 | Lees | Nov. 22, 1960 |